(12) United States Patent
Okada et al.

(10) Patent No.: US 11,819,831 B2
(45) Date of Patent: Nov. 21, 2023

(54) STEAM REFORMING CATALYST

(71) Applicant: Renaissance Energy Research Corporation, Kyoto (JP)

(72) Inventors: Osamu Okada, Koyoto (JP); Kana Motomura, Kyoto (JP); Junya Miyata, Kyoto (JP); Chika Takada, Kyoto (JP); Itsuro Kuwasako, Oita (JP); Manami Kawano, Oita (JP)

(73) Assignee: RENAISSANCE ENERGY RESEARCH CORPORATION, Kyoto (JP)

( * ) Notice: Subject to any disclaimer, the term of this patent is extended or adjusted under 35 U.S.C. 154(b) by 187 days.

(21) Appl. No.: 17/264,789

(22) PCT Filed: Jun. 11, 2019

(86) PCT No.: PCT/JP2019/023054
§ 371 (c)(1),
(2) Date: Jan. 29, 2021

(87) PCT Pub. No.: WO2020/026597
PCT Pub. Date: Feb. 6, 2020

(65) Prior Publication Data
US 2021/0291151 A1    Sep. 23, 2021

(30) Foreign Application Priority Data
Aug. 3, 2018 (JP) .................................. 2018-146424

(51) Int. Cl.
*B01J 23/889* (2006.01)
*C01B 3/40* (2006.01)

(52) U.S. Cl.
CPC ............. *B01J 23/8892* (2013.01); *C01B 3/40* (2013.01); *C01B 2203/0233* (2013.01); *C01B 2203/1058* (2013.01); *C01B 2203/1082* (2013.01)

(58) Field of Classification Search
CPC .. B01J 35/0006; B01J 23/8892; B01J 35/023; B01J 2523/00; B01J 35/1014;
(Continued)

(56) References Cited

U.S. PATENT DOCUMENTS 4,990,481 A      2/1991  Sato et al.
8,343,456 B2 *   1/2013  Kawashima ......... B01J 37/0205
                                                    423/652

(Continued)

FOREIGN PATENT DOCUMENTS

JP    S4869783 A    9/1973
JP    H0243952 A    2/1990
(Continued)

OTHER PUBLICATIONS

NPL_Song et al. Applied Catalysis A General 530 (2017) 184-19 (Year: 2017).*
(Continued)

*Primary Examiner* — Anthony J Zimmer
*Assistant Examiner* — Jordan W Taylor
(74) *Attorney, Agent, or Firm* — Andrew L. Dunlap; Haynes Beffel & Wolfeld LLP

(57) ABSTRACT

A Ni-based steam reforming catalyst having excellent carbon deposition resistance and sintering resistance is provided. The steam reforming catalyst is constituted by including nickel as a catalytically active metal, lanthanum as a first co-catalyst component, manganese as a second co-catalyst component, and a carrier containing γ-alumina as a main component.

4 Claims, 10 Drawing Sheets

| Sample # | Content (wt%) | | $C_3H_8$ conversion rate (%) <Initial evaluation> | | | $H_2$ unit adsorption amount <Prior to initial evaluation> ($cm^3/g$) | Coking amount <After initial evaluation> (%) |
|---|---|---|---|---|---|---|---|
| | Ni | La | 400°C | 500°C | 600°C | | |
| A1 | 2 | 5 | 3.85 | 9.78 | 24.35 | 0.012 | 0.11 |
| A2 | 5 | 5 | 6.92 | 37.96 | 91.78 | 0.437 | 0.17 |
| A3 | 8 | 5 | 40.28 | 79.68 | 100 | 0.985 | 0.3 |
| A4 | 10 | 5 | 76.1 | 100 | 100 | 1.182 | 0.2 |
| A5 | 15 | 5 | 88.51 | 100 | 100 | 2.088 | 3.85 |
| A6 | 20 | 5 | 99.17 | 100 | 100 | 2.355 | 5.14 |

(58) Field of Classification Search
CPC ...... B01J 35/1019; B01J 21/04; B01J 23/889; C01B 3/40; C01B 2203/0233; C01B 2203/1058; C01B 2203/1082; Y02P 20/52
See application file for complete search history.

(56) References Cited

U.S. PATENT DOCUMENTS

| | | | |
|---|---|---|---|
| 2005/0221977 | A1 | 10/2005 | Fukunaga et al. |
| 2007/0172416 | A1 | 7/2007 | Kawashima et al. |
| 2017/0137285 | A1* | 5/2017 | Ide ............................ B01J 23/10 |

FOREIGN PATENT DOCUMENTS

| | | | | |
|---|---|---|---|---|
| JP | 108-231204 | A | 9/1996 | |
| JP | 2005169236 | A | 6/2005 | |
| JP | 2011007047 | A | 1/2011 | |
| JP | 201317913 | A | 1/2013 | |
| JP | 2017029970 | A | 2/2017 | |
| RU | 2446879 | C1 * | 4/2012 | .............. B01J 21/02 |
| WO | 02078840 | A1 | 10/2002 | |
| WO | 2005079978 | A1 | 9/2005 | |

OTHER PUBLICATIONS

PCT/JP2019/023054—International Search Report (with English Translation) dated Aug. 27, 2019, 10 pages.

* cited by examiner

| Sample # | Content (wt%) | | C₃H₈ conversion rate (%) ⟨Initial evaluation⟩ | | | H₂ unit adsorption amount ⟨Prior to initial evaluation⟩ (cm³/g) | Coking amount ⟨After initial evaluation⟩ (%) |
|---|---|---|---|---|---|---|---|
| | Ni | La | 400°C | 500°C | 600°C | | |
| A1 | 2 | 5 | 3.85 | 9.78 | 24.35 | 0.012 | 0.11 |
| A2 | 5 | 5 | 6.92 | 37.96 | 91.78 | 0.437 | 0.17 |
| A3 | 8 | 5 | 40.28 | 79.68 | 100 | 0.985 | 0.3 |
| A4 | 10 | 5 | 76.1 | 100 | 100 | 1.182 | 0.2 |
| A5 | 15 | 5 | 88.51 | 100 | 100 | 2.088 | 3.85 |
| A6 | 20 | 5 | 99.17 | 100 | 100 | 2.355 | 5.14 |

Fig. 1

| Sample # | Content (wt%) | | $C_3H_8$ conversion rate (%) <Initial evaluation> | | | $H_2$ unit adsorption amount <Prior to initial evaluation> ($cm^3/g$) | Coking amount <After initial evaluation> (%) |
|---|---|---|---|---|---|---|---|
| | Ni | La | 400°C | 500°C | 600°C | | |
| B0 | 10 | 0 | 8.19 | 38.01 | 91.74 | 1.132 | 7.42 |
| B1 | 10 | 5 | 76.1 | 100 | 100 | 1.182 | 0.2 |
| B2 | 10 | 8 | 70.22 | 96.93 | 100 | 1.19 | 0.12 |
| B3 | 10 | 10 | 68.58 | 100 | 100 | 1.02 | 0.06 |
| B4 | 10 | 12 | 69.92 | 100 | 100 | 1.031 | 0.1 |
| B5 | 10 | 20 | 30.31 | 97.93 | 100 | 0.807 | 0.56 |

Fig. 2

| Sample # | Content (wt%) | | $C_3H_8$ conversion rate (%) <Initial evaluation> | | | $H_2$ unit adsorption amount <Prior to initial evaluation> | | | Coking amount <After initial evaluation> |
|---|---|---|---|---|---|---|---|---|---|
| | Ni | La | 400°C | 500°C | 600°C | $H_2$ unit adsorption amount ($cm^3/g$) | Metallic dispersity (%) | Average particle size (nm) | (%) |
| C1 | 10 | 10 | 68.58 | 100 | 100 | 1.02 | 4.195 | 24.132 | 0.06 |
| C2 | 12 | 10 | 87.14 | 100 | 100 | 1.402 | 4.345 | 23.297 | 0.25 |
| C3 | 15 | 10 | 94.31 | 100 | 100 | 1.84 | 4.626 | 21.886 | 0.27 |
| C4 | 20 | 10 | 79.98 | 100 | 100 | 2.343 | 4.448 | 22.761 | 0.379 |
| X1 | — | — | 69.73 | 93.5 | 99.04 | 2.34 | 325.006 | 0.411 | 0.14 |
| X2 | 17–18 | — | 6.11 | 38.3 | 75.37 | 0.392 | 1.166 | 86.82 | 0.332 |

Fig. 3

| Sample # | Content (wt%) | | | $C_3H_8$ conversion rate (%) <Initial evaluation> | | | $H_2$ unit adsorption amount (cm³/g) | | Coking amount (%) |
|---|---|---|---|---|---|---|---|---|---|
| | Ni | La | Mn | 400°C | 500°C | 600°C | Prior to initial evaluation | After initial evaluation | After initial evaluation |
| C3 | 15 | 10 | 0 | 97.08 | 100 | 100 | 1.64 | 1.187 | 0.31 |
| D1 | 15 | 10 | 0.05 | 94.95 | 100 | 100 | 1.763 | 1.295 | 0.26 |
| D2 | 15 | 10 | 0.1 | 82.92 | 100 | 100 | 1.583 | 1.023 | 0.15 |
| D3 | 15 | 10 | 0.2 | 88.64 | 100 | 100 | 1.705 | 1.422 | 0.2 |
| D4 | 15 | 10 | 0.5 | 94.71 | 100 | 100 | 1.664 | 1.399 | 0.24 |
| D5 | 15 | 10 | 1 | 95.35 | 100 | 100 | 1.589 | 1.217 | 0.14 |
| D6 | 15 | 10 | 1.5 | 87.93 | 100 | 100 | 1.515 | 1.253 | 0.22 |
| D7 | 15 | 10 | 2 | 94.71 | 100 | 100 | 1.603 | 1.318 | 0.19 |
| X1 | — | — | — | 69.73 | 93.5 | 99.04 | 2.34 | — | 0.14 |

Fig. 5

| Sample # | Content (wt%) | | | $C_3H_8$ conversion rate (%) <Initial evaluation> | | | $H_2$ unit adsorption amount <Prior to initial evaluation> | Coking amount <After initial evaluation> |
|---|---|---|---|---|---|---|---|---|
| | Ni | La | Mn | 400°C | 500°C | 600°C | (cm³/g) | (%) |
| E1 | 14.25 | 10 | 0.75 | 83.63 | 100 | 100 | 1.537 | 0.11 |
| E2 | 13.5 | 10 | 1.5 | 91.56 | 100 | 100 | 1.321 | 0.1 |
| E3 | 12 | 10 | 3 | 84.04 | 100 | 100 | 0.964 | 0.14 |
| E4 | 9.5 | 10 | 0.5 | 76.04 | 100 | 100 | 0.873 | 0.29 |
| E5 | 9 | 10 | 1 | 78.03 | 100 | 100 | 0.766 | 0.2 |
| E6 | 8 | 10 | 2 | 82.65 | 100 | 100 | 0.611 | 0.16 |
| X1 | — | — | — | 69.73 | 93.5 | 99.04 | 2.34 | 0.14 |

Fig. 6

| Sample # | Second co-catalyst component (Metal) | Content (wt%) | | | $C_3H_8$ conversion rate (%) <Initial evaluation> | | | $H_2$ unit adsorption amount <Prior to initial evaluation> | Coking amount <After initial evaluation> |
|---|---|---|---|---|---|---|---|---|---|
| | | Ni | La | Metal | 400°C | 500°C | 600°C | ($cm^3/g$) | (%) |
| F1 | Ca | 13.5 | 10 | 1.5 | 82.87 | 100 | 100 | 1.57 | 0.34 |
| F2 | V | 13.5 | 10 | 1.5 | 76.97 | 100 | 100 | 1.025 | 0.39 |
| F3 | Cr | 13.5 | 10 | 1.5 | 87.92 | 100 | 100 | 0.938 | 2.38 |
| F4 | Fe | 13.5 | 10 | 1.5 | 54.24 | 100 | 100 | 1.221 | 0.09 |
| F5 | Co | 13.5 | 10 | 1.5 | 15.96 | 84.66 | 100 | 1.542 | 0.23 |
| F6 | Cu | 13.5 | 10 | 1.5 | 7.89 | 29.12 | 72.86 | 0.804 | 14.58 |
| F7 | Zn | 13.5 | 10 | 1.5 | 79.22 | 100 | 100 | 0.681 | 0.16 |
| F8 | Mo | 13.5 | 10 | 1.5 | 61.09 | 100 | 100 | 1.494 | 0.15 |
| F9 | W | 13.5 | 10 | 1.5 | 70.58 | 100 | 100 | 1.239 | 0.07 |
| E2 | Mn | 13.5 | 10 | 1.5 | 91.56 | 100 | 100 | 1.321 | 0.1 |
| X1 | — | — | — | — | 69.73 | 93.5 | 99.04 | 2.34 | 0.14 |

Fig. 7

| Sample # | Carrier | Content (wt%) | | | C₃H₈ conversion rate (%) <Initial evaluation> | | | | H₂ unit adsorption amount (cm³/g) | | Coking amount (%) |
|---|---|---|---|---|---|---|---|---|---|---|---|
| | | Ni | La | Metal | 400°C | 500°C | 600°C | | Prior to initial evaluation | After initial evaluation | After initial evaluation |
| D2 | γ-alumina | 15 | 10 | 0.1 | 93.17 | 100 | 100 | | 1.75 | 1.336 | 0.16 |
| E2 | γ-alumina | 13.5 | 10 | 1.5 | 86.93 | 100 | 100 | | 1.529 | 1.469 | 0.18 |
| G1 | Carrier A | 15 | 10 | 0.1 | 8.7 | 25.65 | 53.33 | | 0.237 | 0.187 | 6.15 |
| G2 | Carrier A | 13.5 | 10 | 1.5 | 2.21 | 12.66 | 38.1 | | 0.026 | 0.023 | 0.18 |
| G3 | Carrier B | 15 | 10 | 0.1 | 3.82 | 16.05 | 41.19 | | 0.196 | 0.163 | 1.24 |
| G4 | Carrier B | 13.5 | 10 | 1.5 | 1.18 | 9.6 | 34.83 | | 0.022 | 0.024 | 0.25 |

Fig. 9

STEAM REFORMING CATALYST

TECHNICAL FIELD

The present invention relates to a steam reforming catalyst used in a steam reforming system in which hydrocarbon-based raw material gas and steam are reformed into carbon monoxide and hydrogen to produce hydrogen.

BACKGROUND ART

As one of energy technologies using environment-friendly hydrogen, a fuel cell which generates electric energy by reacting hydrogen and oxygen has attracted attention. As a hydrogen source of a fuel cell, various hydrocarbon-based raw materials such as natural gas and coal-based hydrocarbons are available, and in particular, hydrocarbons with improved supply infrastructure such as city gas, LP gas, naphtha, gasoline, and kerosene are suitably available. A synthesis gas of carbon monoxide and hydrogen is generated by a reforming reaction of these hydrocarbon-based raw materials with steam in the presence of a steam reforming catalyst, and carbon monoxide in the synthesis gas is removed by a water-gas-shift reaction process, a selective oxidation process, or the like, thereby producing hydrogen.

As a steam reforming catalyst, a Ni catalyst using nickel (Ni) as a catalytically active metal and a noble metal catalyst using a noble metal such as ruthenium (Ru) as a catalytically active metal have been used in practical use (see Patent Documents 1 and 2 and the like).

Ni catalysts are generally widely used as industrial steam reforming catalysts and partial oxidation and autothermal reforming catalysts, but the Ni catalysts with plain Ni metal cannot withstand actual use due to significant carbon deposition under reforming reaction conditions (particularly, natural gas containing naphtha, LP gas and heavy hydrocarbons), regardless of supported catalyst and impregnation catalyst and kneading catalyst. Therefore, Ni catalysts with potassium (K) or magnesium (Mg) having a carbon deposition suppressing effect added as a co-catalyst are put into practical use and widely used worldwide (see Patent Document 3 and the like).

However, in order to further improve the energy efficiency of the hydrogen production process in the future, it is desired to operate under more severe low S/C conditions (SIC: molar ratio of carbon (C) and raw material steam ($H_2O$) in the raw material hydrocarbon of the hydrogen production process), and in the present hydrogen production process, high-efficiency low S/C conditions cannot be adopted due to the carbon deposition risk of the Ni-based steam reforming catalyst, which is the main stream. In this case, since the carbon deposition suppressing effect is insufficient in the existing industrial Ni catalyst, a Ru catalyst having excellent carbon deposition resistance has been put into practical use in, for example, a substitute natural gas (SNG) manufacturing process for a city gas business in which severe operation is particularly desired.

The Ru catalyst is also superior to the Ni catalyst in sintering resistance. Therefore, if a high-performance desulfurization technology is employed and sulfur poisoning is completely prevented, a compact reactor and a long life can be achieved at the same time, and therefore, the adoption of the Ru catalyst to a reformer for a fuel cell, which is expected to have a catalyst replacement cycle of 5 years or more, is advancing.

PRIOR ART DOCUMENTS

Patent Documents

PATENT DOCUMENT 1: Japanese Patent Application Publication No. H02-43952
PATENT DOCUMENT 2: Japanese Patent Application Publication No. H08-231204
PATENT DOCUMENT 3: Japanese Patent Application Publication No. 2017-29970

SUMMARY OF THE INVENTION

Problems to be Solved by the Invention

In the energy field such as fuel cell vehicles and household fuel cells, the utilization of hydrogen is expected to increase rapidly in the future. However, in the hydrogen production system, many rare and expensive noble metals are used, and the technology development leading to the reduction of their usage is urgent. In particular, among the platinum group metals, Ru is produced in a particularly small amount, which is one order of magnitude less than platinum (Pt) and palladium (Pd), but because Ru has excellent characteristics as a reforming catalyst for hydrogen production, its use as a reforming catalyst for a fuel cell requiring high performance is rapidly increasing, and it is expected that Ru will be used in large quantities in the future. As an example, the annual production amount (20 t) of Ru is consumed only by the reforming catalyst for 4 million kW of the household fuel cell.

If the carbon deposition resistance and sintering resistance can be improved to the same level as that of the Ru catalyst in the Ni-based catalyst in which the carbon deposition resistance is improved by adding an existing co-catalyst, it becomes possible to replace the Ru catalyst, and it becomes possible to stably provide a high-performance steam reforming catalyst without being influenced by the resource constraint of Ru.

The present invention has been made in view of the above-mentioned problems, and an object thereof is to provide a Ni-based steam reforming catalyst excellent in carbon deposition resistance and sintering resistance.

Means for Solving the Problem

The steam reforming catalyst according to the present invention is characterized in that it comprises nickel as a catalytically active metal, lanthanum as a first co-catalyst component, manganese as a second co-catalyst component, and a carrier containing γ-alumina as a main component.

Further, in the steam reforming catalyst of the above feature, it is preferable that with respect to a total weight of the catalytically active metal, the first co-catalyst component, the second co-catalyst component, and the carrier,
  a content of the catalytically active metal is 11 wt % or more and 18 wt % or less,
  a content of the first co-catalyst component is 8 wt % or more and 12 wt % or less, and
  a content of the second co-catalyst component is 0.05 wt % or more and 3 wt % or less.

Further, in the steam reforming catalyst of the above feature, it is preferable that a total content of the first co-catalyst component and the second co-catalyst component is 10.05 wt % or more and 15 wt % or less with respect to a total weight of the catalytically active metal, the first co-catalyst component, the second co-catalyst component, and the carrier.

Further, in the steam reforming catalyst of the above feature, it is preferable that a total content of the catalytically active metal and the second co-catalyst component is 11.05 wt % or more and 21 wt % or less with respect to a total weight of the catalytically active metal, the first co-catalyst component, the second co-catalyst component, and the carrier.

Further, in the steam reforming catalyst of the above feature, it is preferable that a weight ratio of the first co-catalyst component to the catalytically active metal is 50% or more and 120% or less.

Further, in the steam reforming catalyst of the above feature, it is preferable that a weight ratio of the second co-catalyst component to the catalytically active metal is 0.33% or more and 20% or less.

Effect of the Invention

According to the steam reforming catalyst of the present invention, nickel as a catalytically active metal and two kinds of metals, lanthanum and manganese as a co-catalyst are present as an aggregate on a carrier containing γ-alumina as a main component, so that a decrease in catalytic activity of nickel is suppressed, and a high conversion rate of hydrocarbons comparable to that of a Ru catalyst can be realized, and as compared with a case where other metals are used as a co-catalyst, carbon deposition, sintering (aggregation), and the like of a catalytically active metal, which are a factor of a decrease in catalytic activity, are suppressed, and a high performance Ni-based steam reforming catalyst can be provided.

BRIEF DESCRIPTION OF THE DRAWINGS

FIG. 1 is a table showing the performance evaluation results for comparative samples A1 to A6 without manganese added.

FIG. 2 is a table showing the performance evaluation results for comparative samples B0 to B5 without manganese added.

FIG. 3 is a table showing the performance evaluation results for comparative samples C1 to C4 without manganese added, ruthenium catalyst X1 for comparison, and industrial nickel catalyst X2 for comparison.

FIG. 5 is a table showing performance evaluation results for comparative sample C3 without manganese added, samples D1 to D7 of the steam reforming catalyst according to the present invention, and ruthenium catalyst X1 for comparison.

FIG. 6 is a table showing the performance evaluation results for samples E1 to E6 of the steam reforming catalyst according to the present invention and ruthenium catalyst X1 for comparison.

FIG. 7 is a table showing performance evaluation results for comparative samples F1 to F9 with a metal other than manganese added as the second co-catalyst component, sample E2 of the steam reforming catalyst according to the present invention, and ruthenium catalyst X1 for comparison.

FIG. 9 is a table showing performance evaluation results for samples D2 and E2 of the steam reforming catalyst according to the present invention, and comparative samples G1 to G4 using a carrier containing α-alumina as a main component.

DESCRIPTION OF EMBODIMENT

Figure 4:
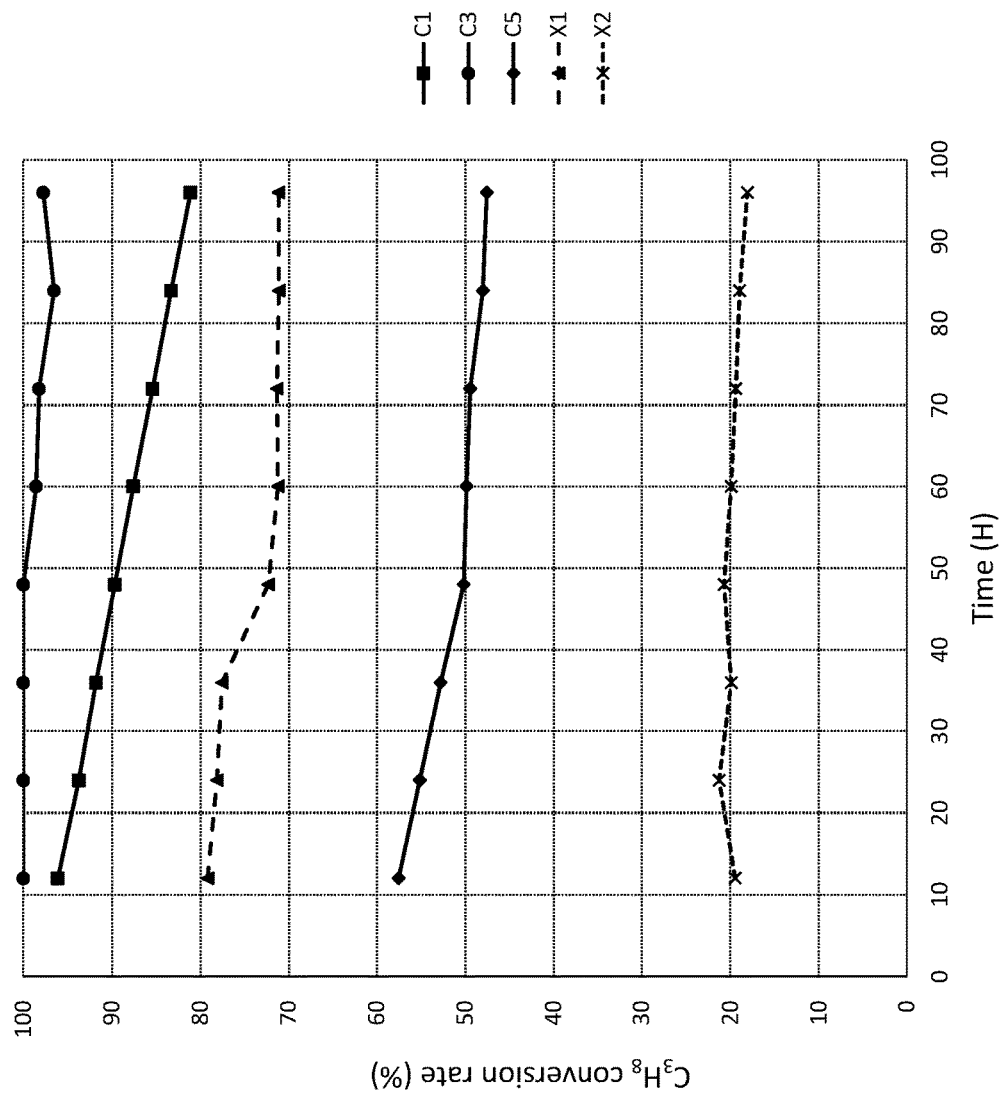
FIG. 4 is a graph showing the results of evaluating $C_3H_8$ conversion rates of comparative samples C1, C3, C5 without manganese added, ruthenium catalyst X1 for comparison, and industrial nickel catalyst X2 for comparison at the reaction temperature of 450° C. for 96 consecutive hours.

Preferred embodiments of the steam reforming catalyst according to the present invention (hereinafter, referred to as "the present embodiment" as appropriate) will be described.

The steam reforming catalyst according to the present embodiment (hereinafter, referred to as "present catalyst" as appropriate) is a catalyst which promotes a steam reforming reaction in which steam is brought into contact with a hydrocarbon to produce a synthesis gas containing carbon monoxide and hydrogen. Note that the steam reforming reaction includes an autothermal reforming reaction accompanied by a partial oxidation reaction due to an oxygen-containing gas during reaction with steam. As the hydrocarbon, as an example, a hydrocarbon gas having 1 to 4 carbon atoms such as methane, ethane, propane, and butane, or an alcohol such as methanol, ethanol, or propanol is utilized. Note that the raw material gas of the steam reforming reaction using the present catalyst is not limited to an example of the above hydrocarbon.

The present catalyst comprises nickel as a catalytically active metal, lanthanum as the first co-catalyst component, manganese as the second co-catalyst component, and a carrier containing γ-alumina as a main component. Nickel, lanthanum and manganese are dispersed and supported on the same granular carrier which is in granular form as an example, and exist as an aggregate.

As will be described later, it has been found by intensive studies of the present inventor that, due to the presence of lanthanum and manganese on the same carrier with nickel which is a catalytically active metal, a function as a co-catalyst for suppressing carbon deposition and sintering of a catalytically active metal which causes a decrease in catalytic activity is improved more than when lanthanum is used alone as the co-catalyst. The present catalyst is based on the research results of the present inventor.

The carrier of the present catalyst contains γ-alumina as a main component (e.g., 80 wt % or more and 100 wt % or less), but may contain a trace amount of inorganic oxide (α-alumina, silica (silicon oxide), zirconia (zirconium oxide), titania (titanium oxide), lanthanum oxide, calcium oxide, and the like) or a trace amount of impurity elements (sulfur, potassium, iron, and the like) other than γ-alumina. With respect to the total weight of the carrier, the total content of the inorganic oxide other than γ-alumina is preferably about 0 to 10 wt %, and the total content of the impurity element is preferably 1 wt % or less. The BET specific surface area of the carrier is not particularly limited, but it is preferable that the BET specific surface area is about 90 to 300 m²/g so that the three components of nickel, lanthanum, and manganese to be supported can be sufficiently dispersed.

In this embodiment, the γ-alumina of the carrier is assumed to be in the form of a powder, but may be a material in which a needle-like or fibrous material becomes lumpy, or may be mixed with a powder-like, a needle-like or fibrous material.

A nickel content is preferably about 11 to 18 wt %, more preferably about 13 to 17 wt %, based on the total weight of three components of nickel, lanthanum and manganese and the carrier (hereinafter, referred to as "the total weight of catalyst"). When the nickel content is increased to be more than 18 wt % based on the total weight of catalyst, the dispersibility is impaired, and the proportion of the active metal exposed on the surface due to aggregation decreases, resulting in a decrease in catalytic activity. Further, when the nickel content is lowered to be less than 11 wt % based on the total weight of catalyst, a decrease in catalytic activity due to a decrease in the amount of supported nickel is caused.

The lanthanum content is preferably about 8 to 12 wt %, more preferably about 10 to 12 wt %, based on the total weight of catalyst. Further, the manganese content is preferably about 0.05 to 3 wt %, more preferably about 0.5 to 2.5 wt %, and still more preferably about 1 to 1.5 wt %, based on the total weight of catalyst.

When the lanthanum content is increased to be more than 12 wt % based on the total weight of catalyst, the dispersibility is impaired, and the proportion of the co-catalyst component exposed on the surface due to aggregation decreases, resulting in a decrease in function as a co-catalyst. Further, when the lanthanum content is lowered to be less than 8 wt % based on the total weight of catalyst, a decrease in function as the co-catalyst due to a decrease in the amount of supported lanthanum is caused. When the manganese content is increased to be more than 3 wt % based on the total weight of catalyst, the dispersibility is impaired, and the proportion of the co-catalyst component exposed on the surface due to aggregation decreases, resulting in a decrease in function as a co-catalyst. Further, when the manganese content is lowered to be less than 0.05 wt % based on the total weight of catalyst, a decrease in function as the co-catalyst due to a decrease in the amount of supported manganese is caused.

Further, the total content of the two components of nickel and manganese is preferably about 11.05 to 21 wt %, more preferably about 11.05 to 18 wt %, and still more preferably 13 to 17 wt %, based on the total weight of catalyst. In addition, the total content of the two components of lanthanum and manganese is preferably about 8.05 to 15 wt %, more preferably about 10.05 to 15 wt %, and still more preferably 10.5 to 14.5 wt %, based on the total weight of catalyst.

Further, the weight ratio of lanthanum to nickel (La/Ni) is preferably about 50 to 120%, and more preferably about 75 to 100%. The weight ratio of manganese to nickel (Mn/Ni) is preferably about 0.33 to 20%, more preferably about 3.33 to 20%, and more preferably about 6.66 to 15%.

Next, a method for preparing the present catalyst will be described using a known impregnation method (the same as the evaporation and drying method) as an example. Note that the method for preparing the present catalyst is not limited to the impregnation method, and a neutralization method or the like may be used.

First, a mixed solution in which a nickel compound, a lanthanum compound, and a manganese compound are dissolved in a solvent such as water, ethanol, acetone or the like is prepared. As each compound of nickel and lanthanum and manganese, nitrate, acetate, sulfate, acetoacetate, hydroxide, chloride, and the like are used, but in particular, nitrate and acetate can be suitably used.

Next, a carrier in powder form or the like is added into the above mixed solution, and the mixture is stirred, and the solvent is evaporated using an evaporator, and subsequently evaporated to dryness through a drying treatment at a predetermined temperature (e.g., 80° C. to 120° C.), and finally, the present catalyst is prepared through a calcination treatment at a predetermined temperature (e.g., 400° C. to 700° C.) Incidentally, the drying atmosphere and the calcination atmosphere is preferably in air. It is to be noted that the carrier in powder form is preferably screened in advance so that the particle size is aligned within a predetermined range (e.g., about 200 μm or less).

The amount of each compound of the above three components of nickel and lanthanum and manganese is set so that each content of the three components is a content (wt %) of oxide after the calcination treatment (nickel oxide, lanthanum oxide, manganese oxide). In other words, each content of the above three components is a content of each oxide of the above three components (value in terms of oxide), and the weight of the above three components constituting the total weight of catalyst is also a weight of each oxide of the above three components.

In the present catalyst immediately after prepared in the above preparation method, all or a part of nickel and lanthanum and manganese supported on a carrier are present as oxides (nickel oxide, lanthanum oxide, and manganese oxide), respectively, and therefore, it is preferable to perform a reduction treatment under a hydrogen atmosphere or a hydrogen-containing atmosphere before using the present catalyst.

In the case where nickel nitrate, lanthanum nitrate, and manganese nitrate are used as the nickel compound, the lanthanum compound, and the manganese compound, for example, to make nickel content, lanthanum content, and manganese content to be 13.5 wt %, 10 wt %, and 1.5 wt %, respectively, the mixed solution is prepared by mixing 50 ml of an aqueous solution of nickel nitrate of 500 mM, 13.35 ml of an aqueous solution of lanthanum nitrate of 500 mM, 5.94 ml of an aqueous solution of manganese nitrate of 500 mM, and 69 ml of pure water (the same amount as the sum of the aqueous solution of nickel nitrate and the aqueous solution of lanthanum nitrate and the aqueous solution of manganese nitrate) to 8.15 g of a carrier. When the content of each of the above three components is changed from the above value, the amount of each of the above aqueous solutions may be appropriately adjusted. Incidentally, the concentration of each aqueous solution and the content of pure water can be changed as appropriate.

[Evaluation Results of Catalytic Performance]

Next, a result of evaluating the catalytic performance of the present catalyst will be described. The catalytic performance was evaluated in three categories of $C_3H_8$ conversion rate, $H_2$ adsorption rate, and the coking amount (the amount of carbon deposition) when the raw material gas for the steam reforming reaction was propane.

The evaluation of the catalytic performance was specifically carried out in each of the following examinations: examination of the suitable range of nickel content and lanthanum content to the total weight of catalyst, examination of the suitable range of the manganese content to the total weight of catalyst, examination that manganese is optimum as the second co-catalyst, examination of the carrier component, and examination of long-term stability. Therefore, the description of the overlapping evaluation methods is omitted in the respective examination sections.

The $C_3H_8$ conversion rate is calculated by Equation 1 shown below after carrying out the following steps; by using a catalyst activity evaluating device manufactured by Hemmi Slide Rule Co. Ltd. and a TCD (thermal conductivity type detector) Model-802 manufactured by Okura Giken (presently Hemmi Slide Rule Co. Ltd.) as a gas chromatograph, previously filling a reaction tube with a catalyst of 0.5 g, performing reduction treatment at 600° C. for 1 hour, supplying and flowing a mixed gas (feed gases) of $N_2$, $C_3H_8$, $H_2$, $H_2O$ (steam) into the reaction tube, holding at a predetermined reaction temperature (e.g., 400° C., 450° C., 500° C., 600° C., etc.) for 1 hour, and then measuring the concentrations of the produced gases ($CO_2$, $C_2H_4$, $C_2H_6$, $C_3H_8$ and $H_2$, $N_2$, CO, $CH_4$) by a gas chromatograph. Incidentally, the supply conditions of the feed gas are as follows, $N_2$: 60 ml/min, $C_3H_8$: 60 ml/min, $H_2$: 6 ml/min, $H_2O$: 360 ml/min, spatial velocity (SV)=60000, and S/C=2.0.

$C_3H_8$ conversion rate (%)=(Concentration (%) of $C_3H_8$ in the feed gases−Concentration (%) of $C_3H_8$ in the produced gases)/(Concentration (%) of $C_3H_8$ in the feed gases)×100    [Equation 1]

In $H_2$ adsorption evaluations, a catalyst analyzer (BEL-CAT) manufactured by Nippon BEL Co. Ltd. (now MicrotracBEL Co. Ltd.) is used to fill a sample tube with about 0.15 g of catalyst, and after replacing the inside of the sample tube with Ar gas, $H_2$ pulses are injected at 600° C. to measure $H_2$ unit adsorption amount ($cm^3/g$), metallic dispersity (%), and mean particle size (nm).

In the coking amount evaluation, a sample is burned in a high temperature furnace and a carbon concentration contained in the sample is measured using a carbon/sulfur analyzer CS744 manufactured by LECO Japan Joint Company to calculate a carbon concentration (wt %) as a coking amount (%) from a ratio of a weight of carbon in the sample to a weight of the sample before burned.

[Examination of Suitable Ranges of Nickel Content and Lanthanum Content]

In the following description, for convenience of description, the content of each component of nickel and lanthanum and manganese or two or more components to the total weight of catalyst is simply referred to as "content" or "total content".

In the present catalyst, as described above, since the manganese content is smaller than that of nickel and lanthanum, a rough examination of respective suitable ranges of nickel content and lanthanum content was first performed in a state in which no manganese was added (manganese content=0 wt %). In this examination, a total of 16 samples of samples A1 to A6 in which the lanthanum content was fixed at 5 wt % and the nickel content was varied between 2 and 20 wt %, samples B0 to B5 in which the nickel content was fixed at 10 wt % and the lanthanum content was varied between 0 and 20 wt %, and samples C1 to C4 in which the lanthanum content was fixed at 10 wt % and the nickel content was varied between 10 and 20 wt % were prepared. Further, as comparative samples for samples C1 to C4, a commercially available ruthenium catalyst X1 (the amount of supported ruthenium: 2 wt %, carrier: γ-alumina) and a commercially available industrial nickel catalyst X2 (NiCa based catalyst, the amount of supported nickel: 17 to 18 wt %, carrier: α-alumina) were prepared.

In this examination, three types of evaluations for $C_3H_8$ conversion rate, $H_2$ adsorption, and coking amount were conducted. However, for samples A1 to A6 and B0 to B5, $H_2$ adsorption was evaluated only in $H_2$ unit adsorption amount.

Respective samples A1 to A6, B0 to B5, and C1 to C4 were prepared by the preparation method of the present catalyst described above (impregnation method). As a mixed solution, a mixture of an aqueous solution of nickel nitrate and an aqueous solution of lanthanum nitrate in predetermined amounts was used so that the nickel content and the lanthanum content became predetermined values, and as a carrier, a γ-alumina carrier having a content of γ-alumina of 96 wt % or more and a content of silica of about 3 wt % and a BET specific surface area of about 180 to 200 $m^2/g$, which was previously dried at 80° C. for 16 hours and then screened so that the particle diameter became about 200 μm or less, was used, and the carrier was added to the above mixed solution so that contents of nickel and lanthanum became the predetermined values.

FIG. 1 shows a summarized list of the evaluation results of $C_3H_8$ conversion rates (initial evaluation at reaction temperatures of 400° C., 500° C., and 600° C.), $H_2$ unit adsorption amounts prior to the initial evaluation of $C_3H_8$ conversion rate (hereinafter simply referred to as "initial evaluation") and coking amounts after the initial evaluation for samples A1 to A6, together with the respective nickel content and lanthanum content. The nickel contents of samples A1 to A6 are 2 wt %, 5 wt %, 8 wt %, 10 wt %, 15 wt %, and 20 wt %, in order, and the lanthanum contents of samples A1 to A6 are constant at 5 wt %, respectively.

From the results shown in FIG. 1, as the nickel content increases, the $H_2$ unit adsorption amount and the $C_3H_8$ conversion rate of the initial evaluation also increase, but it can be seen that the coking amount after the initial evaluation is rapidly increased when the nickel content exceeds 10 wt %. From the above results, it can be seen that the nickel content is preferably 10 wt % or more from the viewpoint of the $H_2$ unit adsorption amount and the $C_3H_8$ conversion rate, but in order to increase the nickel content to more than 10 wt %, considering the coking suppression effect of lanthanum shown in FIG. 2, which will be described later, it can be seen that the lanthanum content is too small at 5 wt %. In other words, it can be seen that the lower limit of the suitable range of the weight ratio of lanthanum to nickel is 50% or more.

FIG. 2 shows a summarized list of the evaluation results of $C_3H_8$ conversion rates (initial evaluation at reaction temperatures of 400° C., 500° C., and 600° C.), $H_2$ unit adsorption amounts prior to the initial evaluation, and coking amounts after the initial evaluation for samples B0 to B5, together with the respective nickel content and lanthanum content. The lanthanum contents of samples B0 to B5 are 0 wt %, 5 wt %, 8 wt %, 10 wt %, 12 wt %, and 20 wt %, in order, and the nickel contents of samples B0 to B5 are constant at 10 wt %, respectively.

From the results shown in FIG. 2, regarding the $C_3H_8$ conversion rate (initial evaluation), samples B1 to B4 (lanthanum content: 5 wt % to 12 wt %) show no significant difference at the respective reaction temperatures and high catalyst activity, whereas sample B0 (lanthanum content is 0 wt %: no addition of lanthanum) shows a decrease in catalyst activity and a decrease in catalyst activity at 400° C. when the lanthanum content is increased to 20 wt % (sample B5). As for the $H_2$ unit adsorption amount prior to the initial evaluation, it becomes the highest when the lanthanum content m is 8 wt %, and when the lanthanum content exceeds 8 wt %, the $H_2$ unit adsorption amount tends to decrease. As for the coking amount after the initial evaluation, it can be seen that, it is very large in sample B0

(lanthanum content is 0 wt %: no addition of lanthanum), and the coking is greatly suppressed by adding lanthanum. In particular, the coking amount is minimized when the lanthanum content is 10 wt % (Sample B3).

FIG. 3 shows a summarized list of the evaluation results of $C_3H_8$ conversion rates (initial evaluation at reaction temperatures of 400° C., 500° C. and 600° C.), $H_2$ adsorptions prior to the initial evaluation ($H_2$ unit adsorption amount, metallic dispersity, average particle size), and coking amounts after the initial evaluation, for samples C1 to C4 and comparative samples X1 and X2, together with the respective contents of nickel and lanthanum of samples C1 to C4. The ruthenium catalyst X1 was subjected to CO adsorption evaluation instead of the $H_2$ adsorption evaluation. The nickel contents of samples C1 to C4 are 10 wt %, 12 wt %, 15 wt %, and 20 wt %, in order and the lanthanum contents of samples C1 to C4 are constant at 10 wt %, respectively.

From the results shown in FIG. 3, the $C_3H_8$ conversion rates of samples C1 to C4 initially evaluated reach 100% at reaction temperatures of 500° C. and 600° C., which is higher than 93.5% (500° C.) and 99.04% (600° C.) of ruthenium catalyst X1, and higher than 69.73% of ruthenium catalyst X1 except for sample C1 (nickel content: 10 wt %), even at reaction temperatures of 400° C., and the $C_3H_8$ conversion rate is almost the same only slightly lower than ruthenium catalyst X1 in sample C1. At a reaction temperature of 400° C., as the nickel content increases from 10 wt % to 15 wt %, the $C_3H_8$ conversion rate also increases, but when the nickel content increases to 20 wt %, the $C_3H_8$ conversion rate conversely decreases. Therefore, considering the $C_3H_8$ conversion rate at the reaction temperature of 400° C., it is estimated that the upper limit of the suitable range of nickel content is in the middle of 15 wt % and 20 wt %, for example, around 17.5 wt %, and the lower limit is in the middle of 10 wt % and 12 wt %. Accordingly, a suitable range of nickel content is estimated to be from 11 wt % to 18 wt %, more preferably from 13 wt % to 17 wt %, and an optimum value of nickel content is estimated to be about 15 wt %.

As for the results of the $H_2$ adsorption evaluation prior to the initial evaluation of samples C1 to C4, although the $H_2$ unit adsorption amount naturally increases as the nickel content increases, the metallic dispersity and the mean particle size show the best results when the nickel content is 15 wt %. Therefore, the upper limit of the suitable range of nickel content is found to be higher than 15 wt % and the lower limit is found to be lower than 15 wt %, which is consistent with the suitable range of nickel content when considering the $C_3H_8$ conversion rate at 400° C.

The coking amount after the initial evaluation is naturally increased when the nickel content increases, but when the nickel content is 12 wt % or more, the coking amount is larger than that of the ruthenium catalyst X1, and is about 1.8 times in sample C2 (nickel content: 12 wt %), about 1.9 times in sample C3 (nickel content: 15 wt %), and about 2.7 times in sample C4 (nickel content: 20 wt %). However, compared with samples A1 to A6 having lanthanum content of 5 wt %, in samples C1 to C4 having lanthanum content of 10 wt %, a sharp increase in the coking amount is sufficiently suppressed even if the nickel content exceeds 10 wt %.

When the evaluation results of the coking amount of samples C1 to C4 shown in FIG. 3 and the evaluation results shown in FIG. 2 are comprehensively judged, the suitable range of the lanthanum content is estimated to be 8 wt % to 12 wt %, more preferably 10 wt % to 12 wt %. Further, when the evaluation results shown in FIGS. 1 to 3 are comprehensively judged, the suitable range of the weight ratio of lanthanum to nickel is estimated to be 50% to 120%, more preferably 75% to 100%.

However, in samples C2 to C4 without manganese added as the second co-catalyst component, even if the nickel content and the lanthanum content are each within a suitable range, since the coking amount is as high as about 2 times that of the ruthenium catalyst X1, it is necessary to add manganese as the second co-catalyst component in order to suppress the coking amount to the same extent as the ruthenium catalyst X1, as will be described later.

Next, FIG. 4 shows the evaluation results of $C_3H_8$ conversion rates evaluated continuously for 96 hours (8 times every 12 hours) at a reaction temperature 450° C. for samples C1, C3, added sample C5 in which the nickel content is 8 wt % and the lanthanum content is 10 wt % (prepared by the same preparation method as samples C1 to C4), and comparative samples X1 and X2. In FIG. 4, the vertical axis represents the $C_3H_8$ conversion rate (%) and the horizontal axis represents the elapsed time. The evaluation condition of the $C_3H_8$ conversion rate is the same as the evaluation condition of the $C_3H_8$ conversion rate of the initial evaluation of samples C1 to C4 shown in FIG. 3, except for the reaction temperature.

From the results shown in FIG. 4, the $C_3H_8$ conversion rate up to 96 hours at the reactive temperature 450° C., not only sample C3 but also sample C1 is higher than the $C_3H_8$ conversion rate of the ruthenium catalyst X1, even in the evaluation up to 96 hours, sample C3 is the most highly evaluated. The $C_3H_8$ conversion rate of the added sample C5 is much lower than that of the ruthenium catalyst X1 because the nickel content of the added sample C5 is as low as 8 wt %.

[Examination of Suitable Range of Manganese Content]

Next, a suitable range of manganese content was investigated using samples D1 to D7, in which the manganese content was varied between 0.05 wt % and 2 wt %, for a combination of 15 wt % and 10 wt % considered to be the optimal combination of nickel and lanthanum contents, samples E1 to E3, in which a portion of the nickel content (varying between 0.75 wt % and 3 wt %) was replaced with manganese content for a combination of 15 wt % and 10 wt % of the nickel and lanthanum contents, and samples E4-E6, in which a portion of the nickel content (varying between 0.5 wt % and 2 wt %) was replaced with manganese content for a combination of 10 wt % and 10 wt % of the nickel and lanthanum content. In this examination, three types of evaluations for $C_3H_8$ conversion rate, $H_2$ adsorption ($H_2$ unit adsorption amount), and coking amount were conducted.

Respective samples D1 to D7 and E1 to E6 were prepared by the preparation method of the present catalyst described above (impregnation method). As a mixed solution, a mixture of an aqueous solution of nickel nitrate and an aqueous solution of lanthanum nitrate and an aqueous solution of manganese nitrate in predetermined amounts was used so that the contents of nickel, lanthanum, and manganese became predetermined values, and as a carrier, a γ-alumina carrier having a content of γ-alumina of 96 wt % or more and a content of silica of about 3 wt % and a BET specific surface area of about 180 to 200 m$^2$/g, which was previously dried at 80° C. for 16 hours and then screened so that the particle diameter became about 200 μm or less, was used, and the carrier was added to the above mixed solution so that contents of nickel, lanthanum, and manganese became the predetermined values.

FIG. 5 shows a summarized list of the evaluation results of $C_3H_8$ conversion rates (initial evaluation at reaction temperatures of 400° C., 500° C., and 600° C.), $H_2$ unit adsorption amounts (before and after the initial evaluation, only before the initial evaluation for comparative sample X1), and coking amounts after the initial evaluation, for comparative sample C3 without manganese added, samples D1 to D7, and comparative sample (ruthenium catalyst) X1, together with the respective contents of nickel, lanthanum, and manganese in samples D1 to D7. Incidentally, sample C3, which was prepared separately from the sample used in the evaluation shown in FIG. 3, was used. Further, the evaluation result of the ruthenium catalyst X1 is the same as the result shown in FIG. 3. The manganese contents of samples D1 to D7 are 0.05 wt %, 0.1 wt %, 0.2 wt %, 0.5 wt %, 1.0 wt %, 1.5 wt %, and 2.0 wt %, in order. The nickel content and the lanthanum content in samples D0 to D7 are both constant at 15 wt % and 10 wt %.

According to the evaluation results of the $H_2$ unit adsorption amount shown in FIG. 5, the $H_2$ unit adsorption amount of sample D2 is the smallest in both results before and after the initial evaluation, but there is no significant difference in the results in the other samples. In particular, after the initial evaluation, samples D1, D3 to D7 other than sample D2 have larger $H_2$ unit adsorption amount than sample D0 without manganese added, indicating the effects of adding manganese.

According to the initial evaluation results of the $C_3H_8$ conversion rate shown in FIG. 5, the $C_3H_8$ conversion rates of samples D0 to D7 are larger than the $C_3H_8$ conversion rate of comparative sample X1, and the respective catalytic activities for samples D0 to D7 are high for the reaction temperatures of 400° C., 500° C., and 600° C. At 400° C., samples D1 to D7 differ in the $C_3H_8$ conversion rate, with the largest $C_3H_8$ conversion rate for sample D5 (manganese content of 1 wt %). The $C_3H_8$ conversion rates of samples D1, D4, D5, and D7 (manganese content: 0.05 wt %, 0.5 wt %, 1.0 wt %, and 2.0 wt %) are larger than that of sample C3 without manganese added shown in FIGS. 3 and 5, and the respective measured values are different, but it is considered that the effects of adding manganese are exhibited.

In the evaluation results of the coking amount shown in FIG. 5, the coking amounts of samples D1 to D7 (manganese content: 0.05 wt % to 2.0 wt %) are smaller than that of sample C3 without manganese added, and the effect of adding manganese is exhibited. In particular, the coking amount of sample D5 (manganese content is 1 wt %) is smallest, and is lowered to the same value as that of the coking amount (0.14%) of comparative sample (ruthenium catalyst) X1. When the manganese content is small, the coking amount tends to be slightly larger. In the range of manganese content from 0.1 wt % to 2.0 wt %, the coking amount is 1.0 to 1.71 times that of comparative sample (ruthenium catalyst) X1 (0.14%).

FIG. 6 shows a summarized list of the evaluation results of $C_3H_8$ conversion rates (initial evaluation at reaction temperatures of 400° C., 500° C. and 600° C.), $H_2$ unit adsorption amounts (prior to the initial evaluation) and the coking amounts after the initial evaluation, for samples E1 to E6 and comparative sample X1 (ruthenium catalyst), together with the respective contents of nickel, lanthanum, and manganese of samples E1 to E6. Note that the evaluation result of the ruthenium catalyst X1 is the same as the content shown in FIG. 3. The manganese contents of samples E1 to E3 are 0.75 wt %, 1.5 wt %, and 3.0 wt %, in order, and the total contents of nickel and manganese and the lanthanum contents are both constant at 15 wt % and 10 wt %. The manganese contents of samples E4 to E6 are 0.5 wt %, 1.0 wt %, and 2.0 wt %, in order, and the total contents of nickel and manganese and the lanthanum contents are both constant at 10 wt % and 10 wt %.

In samples E1 and E4, 5 wt % of the amount of supported nickel is replaced with manganese, in samples E2 and E5, 10 wt % of the amount of supported nickel is replaced with manganese, and in samples E3 and E6, 20 wt % of the amount of supported nickel is replaced with manganese. For this reason, the weight ratio of the amounts of supported nickel and manganese (nickel:manganese) is 19:1 in samples E1 and E4, 9:1 in samples E2 and E5, and 4:1 in samples E3 and E6.

The evaluation results of the $H_2$ unit adsorption amount shown in FIG. 6 show that the $H_2$ unit adsorption amount increases as the nickel content increases, and this tendency is the same as the results of samples A1 to A6 and samples C1 to C4 to which manganese is not added shown in FIG. 1 and FIG. 3. In samples E1 to E6, since the nickel content decreases as the added amount of manganese increases and the influence of the nickel content change is large, the effect of adding manganese on the $H_2$ unit adsorption amount is not clear from the results of samples E1 to E6, but it is not inconsistent with the evaluation results of the $H_2$ unit adsorption amount shown in FIG. 5.

According to the initial evaluation results of the $C_3H_8$ conversion rate shown in FIG. 6, the $C_3H_8$ conversion rates of samples E1 to E6 are larger than the $C_3H_8$ conversion rate of comparative sample X1, and the respective catalytic activities for samples E1 to E6 are also high for the reaction temperatures of 400° C., 500° C., and 600° C. When the reaction temperature is 400° C., there is a difference in the $C_3H_8$ conversion rate between samples E1 to E6. According to the evaluation results of the $C_3H_8$ conversion rates of samples C1 to C4 without manganese added, shown in FIG. 3, when the lanthanum contents are constant at 10 wt %, the nickel content increases up to 15 wt %, and the $C_3H_8$ conversion rate also increases. However, between samples E1 to E3 with manganese added, the $C_3H_8$ conversion rate of sample E2 having the nickel content of 13.5 wt % is higher than that of samples E1 and E3 having the nickel contents of 14.25 wt % and 12 wt %, so that the effectiveness of adding manganese can be said to be higher in the order of manganese contents of 1.5 wt %, 3.0 wt %, and 0.75 wt %. On the other hand, in samples E4 to E6 with manganese added, unlike samples C1 to C4 without manganese added, the lower the nickel content is, the higher the $C_3H_8$ conversion rate is, and the higher the manganese content is, the higher the $C_3H_8$ conversion rate is. From the above, it can be seen that the effect of adding manganese on the $C_3H_8$ conversion rate is clearly present.

When sample E2 is compared to sample E1, even if the nickel content is reduced by 0.75 wt %, since the manganese content is increased by 0.75 wt %, the $C_3H_8$ conversion rate at 400° C. is greatly increased from 83.63% to 91.56%. However, when sample E3 is compared to sample E2, even if the nickel content is reduced by 1.5 wt % and the manganese content is increased by 1.5 wt %, the $C_3H_8$ conversion rate at 400° C. is reduced from 91.56% to 84.04%. In this regard, considering the results of samples E4 to E6 and that the $C_3H_8$ conversion rate at 400° C. of sample C2, which has the same nickel and lanthanum contents as sample E3 and has no manganese added, is 87.14%, it is considered that the 3 wt % of manganese content slightly exceeds the upper limit of the suitable range of the manganese content to the $C_3H_8$ conversion rate. Therefore, the upper limit of the suitable range of the manganese content is considered to be within a range of 2.5 to 3.0 wt %, more preferably 2.0 to 2.5 wt %. Further, the lower limit of the suitable range of the manganese content is considered to be 0.05 wt %, more preferably 0.5 wt %.

In the evaluation results of the coking amount shown in FIG. 6, although the nickel content is higher in samples E1 to E3 than in samples E4 to E6, the coking amount is smaller, and the coking amounts of samples E1 to E3 are less than or equal to the coking amount (0.14%) of comparative sample (ruthenium catalyst) X1.

In light of that regarding the evaluation results of the $C_3H_8$ conversion rate (initial evaluation) and the coking amount at 400° C., the $C_3H_8$ conversion rate is the largest and the coking amount is the smallest in sample D5 (manganese content is 1 wt %) among samples D0 to D7 shown in FIG. 5, and the $C_3H_8$ conversion rate is the largest and the coking amount is the smallest in sample E2 (manganese content is 1.5 wt %) among samples E1 to E3 shown in FIG. 6, an optimum value of the manganese content is estimated to be around 1.0 to 1.5 wt % (equivalent to 6.66 to 10 wt % of the amount of supported nickel when based on the amount of supported nickel).

Further, when the evaluation result of the coking amount shown in FIG. 6 and the evaluation result of the coking amount shown in FIG. 5 are contrasted, it can be seen that by lowering the nickel content by 0.75 to 3 wt % from 15 wt %, and instead setting the manganese content to 0.75 to 3 wt %, the coking amount can be suppressed to be equal to or lower than that of comparative sample X1 while maintaining higher catalytic activity than that of comparative sample (ruthenium catalyst) X1. From this, it is considered that by replacing a portion of nickel having a content within a suitable range with manganese having a content within a suitable range, the coking amount can be suppressed to be equal to or lower than that of comparative sample X1 while maintaining higher catalytic activity than that of comparative sample (ruthenium catalyst) X1.

Taken together the evaluation results of the above samples A1 to A6, B0 to B7, C1 to C5, D1 to D7, and E1 to E6, the followings are assumed as respective suitable ranges of nickel content, lanthanum content, and content manganese.

Nickel: 11 to 18 wt %, more preferably 13 to 17 wt %.
Lanthanum: 8 to 12 wt %, more preferably 10 to 12 wt %.
Manganese: 0.05 to 3 wt %, more preferably 0.5 to 2.5 wt %, and even more preferably 1 to 1.5 wt %.

Further, a suitable range of the total content of nickel and manganese is assumed to be 11.05 to 21 wt %, more preferably 11.05 to 18 wt %, and still more preferably 13 to 17 wt %.

Further, a suitable range of the total content of lanthanum and manganese is assumed to be 8.05 to 15 wt %, more preferably 10.05 to 15 wt %, and still more preferably 10.5 to 14.5 wt %.

Further, a suitable range for the weight ratio of lanthanum to nickel (La/Ni) is assumed to be 50 to 120%, more preferably 75 to 100%.

Further, a suitable range for the weight ratio of manganese to nickel (Mn/Ni) is assumed to be 0.33 to 20%, more preferably 3.33 to 20%, and even more preferably 6.66 to 15%.

[Examination of the Second Co-Catalyst Component]

At the selection of manganese as the second co-catalyst component of the present catalyst, samples F1 to F9 using calcium (Ca), vanadium (V), chromium (Cr), iron (Fe), cobalt (Co), copper (Cu), zinc (Zn), molybdenum (Mo), and tungsten (W) other than manganese as the second co-catalyst component were prepared, and $C_3H_8$ conversion rate (initial evaluation at reaction temperatures of 400° C., 500° C., 600° C.), $H_2$ unit adsorption amount, and coking amount after initial evaluation were evaluated. Note that in samples F1 to F9, nickel content, lanthanum content, and a content of the second co-catalyst component were 13.5 wt %, 10 wt %, and 1.5 wt %, respectively, and these samples were prepared using nitrates of respective metals of the second co-catalyst component instead of manganese nitrate of sample E2 by the same preparation method as sample E2.

FIG. 7 shows a summarized list of the evaluation results of the $C_3H_8$ conversion rates (initial evaluation at reaction temperatures of 400° C., 500° C., and 600° C.), the $H_2$ unit adsorption amounts (prior to initial evaluation), and the coking amounts after initial evaluation, for samples F1 to F9, sample E2, and comparative sample (ruthenium catalyst) X1, together with the metals used as the second co-catalyst component, and the respective contents of nickel, lanthanum, and the metal of samples F1 to F9. The evaluation result of sample E2 is the same as shown in FIG. 6, and the evaluation result of the ruthenium catalyst X1 is the same as shown in FIG. 3.

In the evaluation results of the $H_2$ unit adsorption amount shown in FIG. 7, the $H_2$ unit adsorption amount is high in the order of sample F1 (calcium), sample F5 (cobalt), sample F8 (molybdenum), and sample E2 (manganese) exhibiting good results, but the $H_2$ unit adsorption amounts of the other samples F2 to F5, F7, and F9 are lower than that of sample E2 (manganese).

In the initial evaluation results of the $C_3H_8$ conversion rate shown in FIG. 7, five samples of sample F3 (chromium), sample F1 (calcium), sample F7 (zinc), sample F2 (vanadium), and sample F9 (tungsten) show the $C_3H_8$ conversion rates higher than comparative sample (ruthenium-catalyst) X1, but all of them show the $C_3H_8$ conversion rate lower than sample E2 (manganese).

In the evaluation result of the coking amount shown in FIG. 7, sample F9 (tungsten) and sample F4 (iron) show the coking amounts lower than sample E2 (manganese) and comparative sample (ruthenium catalyst) X1, which are good results.

However, when the three kinds of evaluation results shown in FIG. 7 are comprehensively judged, it can be seen that manganese is most suitable as the second co-catalyst component, as will be described below.

In sample F4 (Fe) having the second lowest coking amount, the $C_3H_8$ conversion rate is low. In sample F3 (chromium), sample F1 (calcium), sample F7 (zinc), and sample F2 (vanadium) having relatively good $C_3H_8$ conversion rates, the coking amounts are higher than comparative sample (ruthenium-catalyst) X1. In sample F1 (calcium), sample F6 (cobalt), and sample F8 (molybdenum) having high $H_2$ unit adsorption amount than sample E2 (manganese), the $C_3H_8$ conversion rates are lower than comparative sample (ruthenium catalyst) X1, or the coking amounts are higher than comparative sample (ruthenium catalyst) X1, or both.

In sample F9 (tungsten), although the $H_2$ unit adsorption amount and the $C_3H_8$ conversion rate at 400° C. is lower than sample E2 (manganese), the coking amount is lowest and is lower than sample E2 (manganese) and comparative sample (ruthenium catalyst) X1. Therefore, it is determined that tungsten is the second most suitable after manganese as the second co-catalytic component among samples F1 to F9.

Therefore, samples F10 and F11, which use tungsten as the second co-catalyst component and have the respective contents of nickel, lanthanum, and the second co-catalyst component same as samples E1 and E2, were additionally prepared in the same preparation method as sample F9, and $C_3H_8$ conversion rates at the reaction temperature of 450° C. were evaluated continuously for 96 hours (8 times every 12 hours) for samples E1 to E3, samples F9 to F11, and comparative sample (ruthenium catalyst) X1. Note that respective contents of nickel, lanthanum, and tungsten of sample F10 are 14.25 wt %, 10 wt %, and 0.75 wt %, and respective contents of nickel, lanthanum, and tungsten of sample F11 is 12 wt %, 10 wt %, and 3 wt %. Incidentally, samples E1 to E3 were prepared separately from the samples used in the evaluation shown in FIG. 6, sample F9 was prepared separately from the sample used in the evaluation shown in FIG. 7, comparative sample X1 was prepared separately from the sample used in the evaluation shown in FIG. 3.

Figure 8:
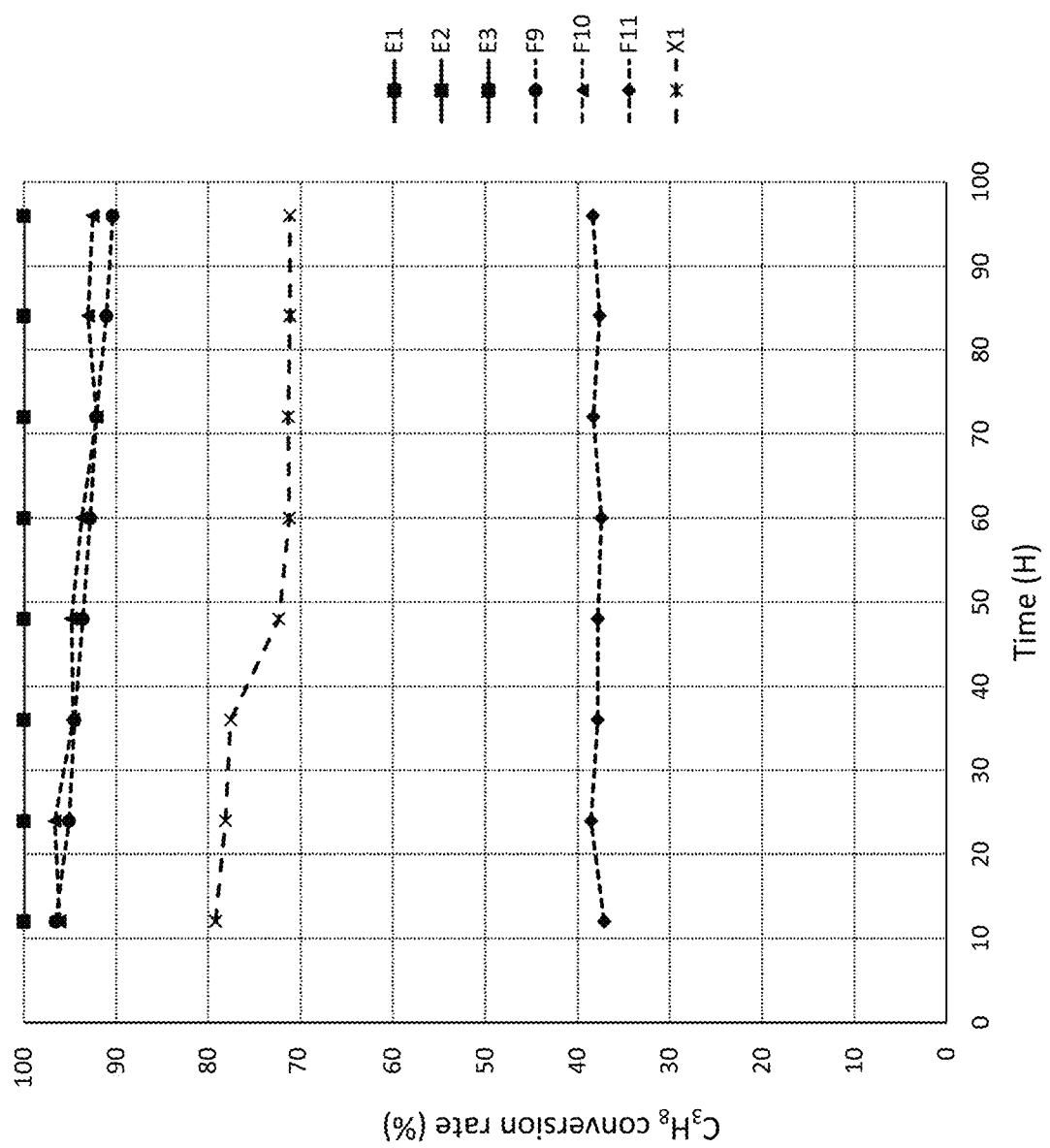
FIG. 8 is a graph showing the results of evaluating $C_3H_8$ conversion rates of samples E1 to E3 of the steam reforming catalyst according to the present invention, comparative samples F9 to F11 with tungsten added as the second co-catalyst component, and ruthenium catalyst X1 for comparison for 96 consecutive hours.

FIG. 8 shows the evaluation results of the $C_3H_8$ conversion rates up to the 96 hours. According to the results shown in FIG. 8, regarding the $C_3H_8$ conversion rates for up to 96 hours at 450° C., while in samples E1 to E3 (manganese), the $C_3H_8$ conversion rate were 100% in all three combinations of the three-component contents, in samples F9 to F11 (tungsten), the $C_3H_8$ conversion rates did not reach 100%, and in samples F10 and F9 having 0.75 wt % and 1.5 wt % tungsten contents, the $C_3H_8$ conversion rates were higher than that of comparative sample (ruthenium catalyst) X1, and in sample F11 having 3 wt % of tungsten content, the $C_3H_8$ conversion rate was much lower than that of comparative sample (ruthenium catalyst) X1.

Therefore, sample F9 having tungsten as the second co-catalyst component shows a slightly lower coking amount than sample E2 (manganese) and a good result, but from the viewpoint of the $C_3H_8$ conversion rate, samples E1 to E3 (manganese) show obviously better results than samples F9 to F11 (tungsten).

[Examination of Carrier Components]

The carrier of the present catalyst is mainly composed of γ-alumina as a main component. Since the catalytic performance of the present catalyst was evaluated in comparison with a comparative example in which the main component of the carrier was changed from γ-alumina to α-alumina, the evaluation results will be described.

In this evaluation, six kinds of catalysts were prepared. Two of them are sample D2 of the present catalyst prepared separately from the sample used in the evaluation shown in FIG. 5, and sample E2 prepared separately from the sample used in the evaluation shown in FIG. 6. The other four are samples G1 to G4 of comparative examples. Samples G1 and G2 are comparative samples in which nickel, lanthanum, and manganese are supported on a carrier A containing α-alumina as a main component. Samples G3 and G4 are comparative samples in which nickel, lanthanum, and manganese are supported on a carrier B containing α-alumina as a main component. Respective contents of nickel, lanthanum, and manganese of samples G1 and G3 are the same as those of sample D2, and are 15 wt %, 10 wt %, and 0.1 wt %, in order. Respective contents of nickel, lanthanum, and manganese of samples G2 and G4 are the same as those of sample E2, and are 13.5 wt %, 10 wt %, and 1.5 wt %, in order.

The carrier A is an α-alumina carrier in which a content of α-alumina is about 99.5 wt %, a content of silica is about 0.5 wt %, and a BET specific surface area is about 6.1 m²/g. The carrier B is an α-alumina carrier in which a content of α-alumina is about 99.4 wt %, a content of silica is about 0.6 wt %, and a BET specific surface area is about 1.8 m²/g.

Samples G1 to G4 were different from samples D2 and E2 only in the carrier, and were prepared in exactly the same preparation method as samples D2 and E2. The carriers A and B which were dried at 80° C. for 16 hours and then screened so that the particle size was about 200 μm or less in advance before preparing samples G1 to G4 were used.

In this examination, three kinds of evaluation of $C_3H_8$ conversion rate (initial evaluation at 400° C., 500° C., 600° C.), $H_2$ unit adsorption amount (before and after the initial evaluation), and coking amount (before and after the initial evaluation) were conducted.

FIG. 9 shows a summarized list of the evaluation results of the $C_3H_8$ conversion rates (the initial evaluation at reaction temperatures of 400° C., 500° C., 600° C.), the $H_2$ unit adsorption amounts (before and after the initial evaluation), and the coking amounts (before and after the initial evaluation) for samples D2, E2, G1 to G4 together with the carriers and the respective contents of nickel, lanthanum, and manganese of samples D2, E2, G1 to G4. The evaluation results of samples D2 and E2 have slight errors with respect to the evaluation results shown in FIGS. 5 and 6, respectively.

In the initial evaluation results of the $C_3H_8$ conversion rates shown in FIG. 9, the initial catalytic activities of samples G1 to G4 having α-alumina as the main component of the carrier are very low regardless of the catalyst composition (content of three components) as compared with samples D2 and E2 having γ-alumina as the main component of the carrier, and are about 10 to 60% of samples D2 and E2.

In the evaluation results of the $H_2$ unit adsorption amounts shown in FIG. 9, the $H_2$ unit adsorption amount is much smaller in samples G1 to G4 having α-alumina as the main component of the carrier than in samples D2 and E2 having γ-alumina as the main component of the carrier. In samples G1 to G4, the higher the manganese content is (samples G2 and G4), the smaller the $H_2$ unit adsorption amount is regardless of the difference between the carriers A and B, and the effects of adding manganese are not exhibited.

In the evaluation results of the coking amounts shown in FIG. 9, between sample E2, G2, G4 having manganese content of 1.5 wt %, there is no large difference in the coking amount before and after the initial evaluation, but between sample D2, G1, G3 having manganese content of 0.1 wt %, the coking amounts after the initial evaluation of samples G1 and G3 (α-alumina carrier) are larger than that of sample D2 (γ-alumina carrier), and it is particularly remarkable for the carrier A having a large BET value. When samples G1 and G3 (α-alumina carrier) and samples E2 and G2 (α-alumina carrier) are compared, the larger the manganese content is, the more the coking is suppressed, and the effect of adding manganese is exhibited.

Taken together the evaluation results of the three items shown in FIG. 9, it can be seen that, with respect to the present catalyst, when the carrier is changed from a carrier containing γ-alumina as a main component to a carrier containing α-alumina as a main component, the catalytic performance of the present catalyst cannot be sufficiently exhibited.

[Examination of Long-Term Stability]

Next, the long-term stability of the present catalyst will be described using the evaluation results of $C_3H_8$ conversion rates evaluated continuously over 1008 hours (84 times every 12 hours) at a reaction temperature 450° C. As the present catalyst, sample E2 in which the respective contents of nickel, lanthanum, and manganese were 13.5 wt %, 10 wt %, and 1.5 wt % was prepared separately from the sample used in the evaluation shown in FIG. 6, and as comparative samples, comparative sample C3 (Ni—La catalyst) without manganese added to the present catalyst was prepared separately from the sample used in the evaluation shown in FIG. 3, and comparative sample X1 (ruthenium catalyst: the amount of supported ruthenium: 2 wt %, carrier: γ-alumina) was prepared separately from the sample used in the evaluation shown in FIG. 3.

Figure 10:
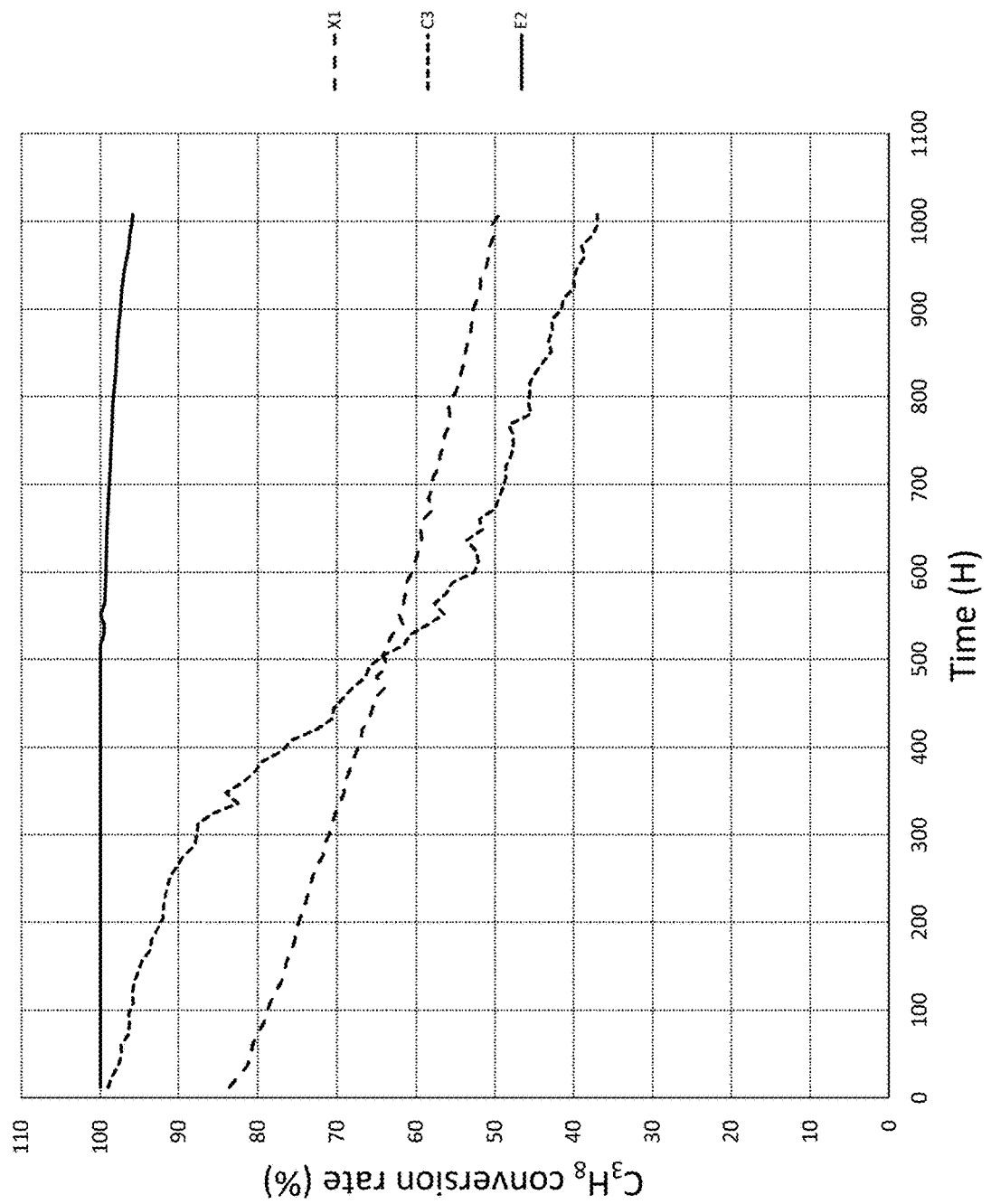
FIG. 10 is a graph showing the results of evaluating $C_3H_8$ conversion rates of sample E2 of the steam reforming catalyst according to the present invention, comparative sample C3 without manganese added, and ruthenium catalyst X1 for comparison for 1000 consecutive hours.

FIG. 10 shows the results of the $C_3H_8$ conversion rates evaluated for samples E2, C3, and X1 continuously for 1008 hours. In FIG. 10, the vertical axis represents the $C_3H_8$ conversion rate (%), and the horizontal axis represents the duration (hours) of the steam reforming reactions.

Sample E2 of the present catalyst maintains the $C_3H_8$ conversion rate higher than that of ruthenium catalyst X1 and exhibits the $C_3H_8$ conversion rate as high as 95.9% at elapsed time 1000 hours, which is about 1.9 times that of ruthenium catalyst X1. On the other hand, in comparative sample C3 without manganese added, the $C_3H_8$ conversion rate is maintained higher than that of the ruthenium catalyst X1 until 500 hours had elapsed, but the $C_3H_8$ conversion rate gradually decreases after the starting of the evaluation, and after 504 hours elapsed, the $C_3H_8$ conversion rate becomes lower than that of the ruthenium catalyst X1. From the above results, it can be seen that by adding manganese as a second co-catalyst, sample E2 of the present catalyst can stably maintain high catalytic activity over a long period of time.

This is because the addition of manganese affects the metal dispersion on the catalyst surface, and as the added amount increases, the sintering resistance improves and the time period for which high metal dispersion can be maintained increases. Incidentally, these points are confirmed by transmission electron microscope (TEM) image of the catalyst particles, element mapping evaluation or the like. Here, the TEM image and the element mapping evaluation result are not shown individually, but FIG. 10 shows the result in which they are reflected.

INDUSTRIAL APPLICABILITY

The present invention is useful as a nickel-based steam reforming catalyst and is suitably used in a steam reforming system.

The invention claimed is:

1. A steam reforming catalyst comprising:
nickel as a catalytically active metal;
lanthanum as a first co-catalyst component;
manganese as a second co-catalyst component; and
a carrier containing γ-alumina as a main component,
wherein, with respect to a total weight of the catalytically active metal, the first co-catalyst component, the second co-catalyst component, and the carrier,
a content of the catalytically active metal is 11 wt % or more and 18 wt % or less,
a content of the first co-catalyst component is 8 wt % or more and 12 wt % or less, and
a content of the second co-catalyst component is 0.05 wt % or more and 3 wt % or less.

2. The steam reforming catalyst according to claim 1, wherein a total content of the first co-catalyst component and the second co-catalyst component is 10.05 wt % or more and 15 wt % or less with respect to a total weight of the catalytically active metal, the first co-catalyst component, the second co-catalyst component, and the carrier.

3. The steam reforming catalyst according to claim 1, wherein a total content of the catalytically active metal and the second co-catalyst component is 11.05 wt % or more and 21 wt % or less with respect to a total weight of the catalytically active metal, the first co-catalyst component, the second co-catalyst component, and the carrier.

4. The steam reforming catalyst according to claim 1, wherein a weight ratio of the second co-catalyst component to the catalytically active metal is 0.33% or more and 20% or less.

* * * * *